United States Patent
Oussoren et al.

(10) Patent No.: US 6,726,735 B1
(45) Date of Patent: Apr. 27, 2004

(54) UNITARY FILTER CARTRIDGE

(75) Inventors: Reinout G. Oussoren, Wiedlisbach (CH); Jack T. Clements, Lee's Summit, MO (US)

(73) Assignee: BHA Group Holdings, Inc., Kansas City, MO (US)

( * ) Notice: Subject to any disclaimer, the term of this patent is extended or adjusted under 35 U.S.C. 154(b) by 0 days.

(21) Appl. No.: 09/430,063

(22) Filed: Oct. 29, 1999

Related U.S. Application Data

(63) Continuation-in-part of application No. 09/273,792, filed on Mar. 22, 1999, now Pat. No. 6,017,378, which is a continuation of application No. 08/862,552, filed on May 23, 1997, now Pat. No. 5,885,314, which is a continuation of application No. 08/350,885, filed on Dec. 6, 1994, now Pat. No. 5,632,791, which is a continuation-in-part of application No. 29/022,499, filed on May 6, 1994, now abandoned.

(51) Int. Cl.⁷ .............................................. B01D 29/21
(52) U.S. Cl. ............................ 55/377; 55/378; 55/379; 55/498; 55/502; 210/473; 210/474
(58) Field of Search .......................... 55/369, 371, 373, 55/375, 376, 377, 378, 379, 381, 498, 502, 500; 210/473, 474

(56) References Cited

U.S. PATENT DOCUMENTS

| | | |
|---|---|---|
| 2,805,731 A | 9/1957 | Kron |
| 2,957,235 A | 10/1960 | Steinberg |
| 4,073,632 A | 2/1978 | Reinauer et al. |

(List continued on next page.)

FOREIGN PATENT DOCUMENTS

| | | |
|---|---|---|
| EP | 0160168 | 2/1985 |
| EP | 0498757 | 1/1992 |
| GB | 630148 | 10/1949 |
| GB | 2407731 | 6/1979 |
| WO | 9000452 | 3/1990 |

OTHER PUBLICATIONS

R+B Filter GmbH, Clean air is our business.
WAM Corporation, Dust Collectors.
Stanelle, Pneu–Fi.
Mahle Industriefilter, Das Mahle Industrie–Filter–Programm.

(List continued on next page.)

Primary Examiner—Minh-Chau T. Pham
(74) Attorney, Agent, or Firm—Shook, Hardy & Bacon L.L.P.

(57) ABSTRACT

A filter cartridge having a unitary construction with a pleat pack filter formed securely about an interior screen for installation in the tube sheet of a baghouse. Opposite ends of the pleat pack are integrally received within a bottom end cap and an upper fitting. The bottom end cap may be molded to follow the contour of the pleat pack, or may be molded as a disk with an inwardly projecting groove to centrally align the pleat pack therein. The upper fitting is formed of a resiliently flexible material and includes an upper flange to overlie and seal with the upper surface of the tube sheet, a tube sheet mouth insert to seal with a circular opening in the tube sheet, a contoured transition to seal with the lower surface of the tube sheet, and a lower cylindrical collar which permanently secures the upper end of the filter. The contoured transition of the fitting is alternatively molded with either an exterior bulge or an interior bulge. The transition with an exterior bulge is resiliently deformed inwardly to pass through the circular opening of the tube sheet during installation. The transition with an interior bulge freely passes through the circular opening of the tube sheet during installation and then receives an expander to outwardly deform the material to seal with the lower surface of the tube sheet. The upper flange of the fitting may be formed as circumferential scallop edge to facilitate tool access for removal of the expander.

17 Claims, 6 Drawing Sheets

U.S. PATENT DOCUMENTS

| | | | |
|---|---|---|---|
| 4,104,170 A | | 8/1978 | Nedza |
| 4,159,197 A | | 6/1979 | Schuler et al. |
| 4,184,966 A | | 1/1980 | Pall |
| 4,217,117 A | | 8/1980 | Syverson |
| 4,219,343 A | | 8/1980 | Peterson |
| 4,220,459 A | | 9/1980 | Hammond et al. |
| 4,244,718 A | | 1/1981 | Noddin |
| 4,251,244 A | | 2/1981 | Evenstad |
| 4,272,263 A | * | 6/1981 | Hancock .................. 55/377 |
| 4,276,069 A | | 6/1981 | Miller |
| 4,291,904 A | | 9/1981 | Iversen et al. |
| 4,292,057 A | * | 9/1981 | Ulvestad et al. ............. 55/377 |
| 4,300,927 A | | 11/1981 | Day |
| 4,310,336 A | | 1/1982 | Peterson |
| 4,312,648 A | | 1/1982 | Day |
| 4,350,509 A | | 9/1982 | Alseth et al. |
| 4,435,197 A | | 3/1984 | Nijhawan et al. |
| 4,445,915 A | | 5/1984 | Robinson |
| 4,559,138 A | | 12/1985 | Harms, II |
| 4,560,477 A | | 12/1985 | Moldow |
| 4,575,422 A | | 3/1986 | Zimmer |
| 4,813,985 A | | 3/1989 | Brennecke et al. |
| 4,954,255 A | | 9/1990 | Muller et al. |
| 5,057,131 A | | 10/1991 | Lackner et al. |
| 5,061,303 A | | 10/1991 | Williams et al. |
| 5,207,811 A | | 5/1993 | Buonpastore |
| 5,207,812 A | | 5/1993 | Tronto et al. |
| 5,211,846 A | | 5/1993 | Kott et al. |
| 5,222,488 A | | 6/1993 | Forsgren |
| 5,224,974 A | | 7/1993 | Johnson |
| 5,290,441 A | * | 3/1994 | Griffin et al. .................. 55/379 |
| 5,290,446 A | | 3/1994 | Degen et al. |
| 5,308,485 A | * | 5/1994 | Griffin et al. .................. 55/379 |
| 5,336,405 A | | 8/1994 | Tang et al. |
| 5,350,515 A | | 9/1994 | Stark et al. |
| 5,730,766 A | * | 3/1998 | Clements .................. 55/377 |
| 5,746,792 A | * | 5/1998 | Clements et al. ............. 55/378 |
| 5,785,724 A | * | 7/1998 | Johnson .................. 55/377 |
| 5,964,909 A | * | 10/1999 | Brunner .................. 55/377 |

OTHER PUBLICATIONS

S.A.V.I.O. Officine s.r.l., Elettrofiltro Serie Plifilter.
Polipleet Filter Elements of MAC Equipment, Inc.
MAC RTC Filter MACartridge Style.
Discovery materials in BHA v. Midwesco, Civil Action 97–0797–CV–W–4 U.S. District Court for the Western District of Missouri, Western Division.

* cited by examiner

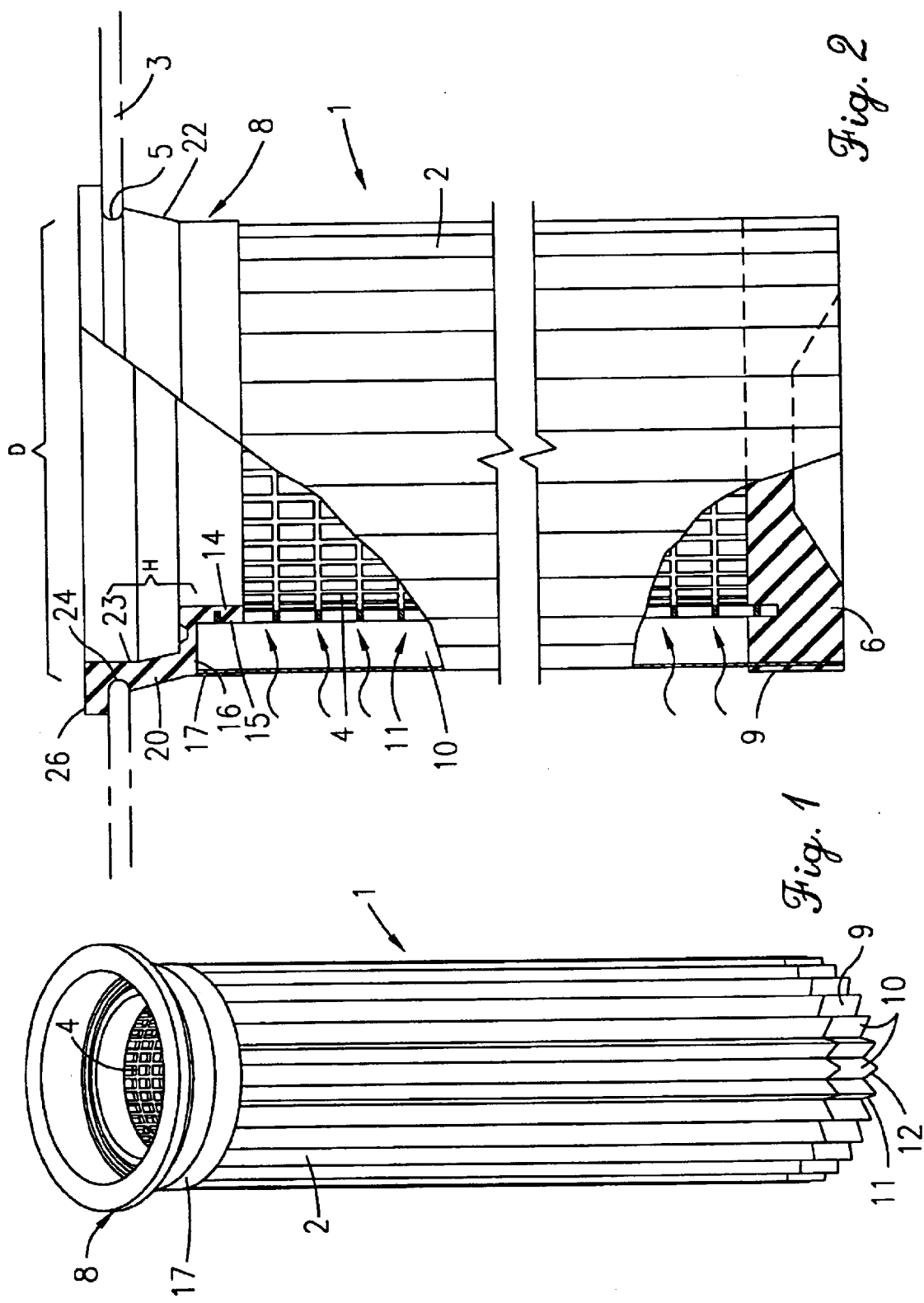

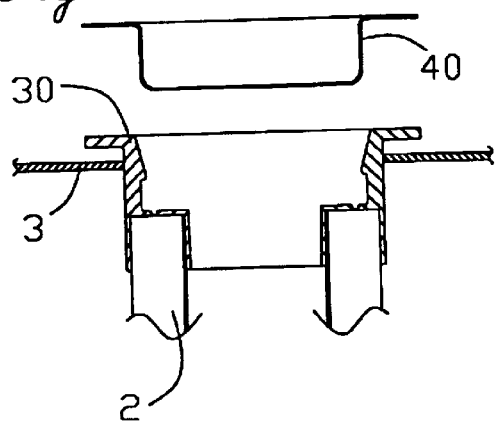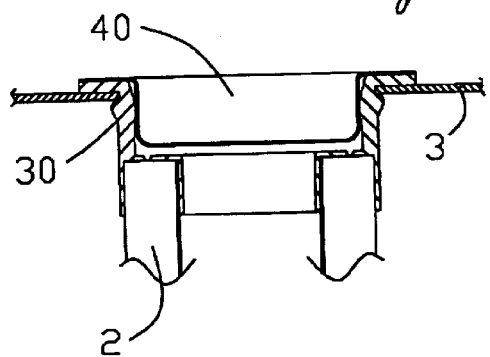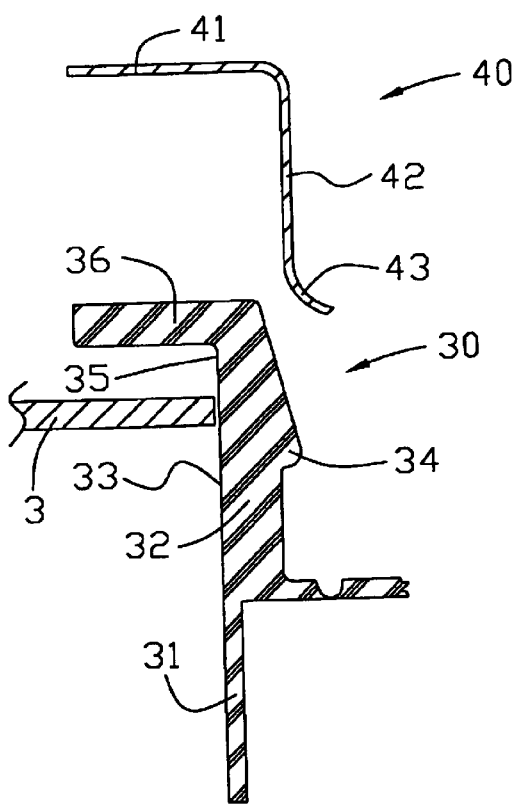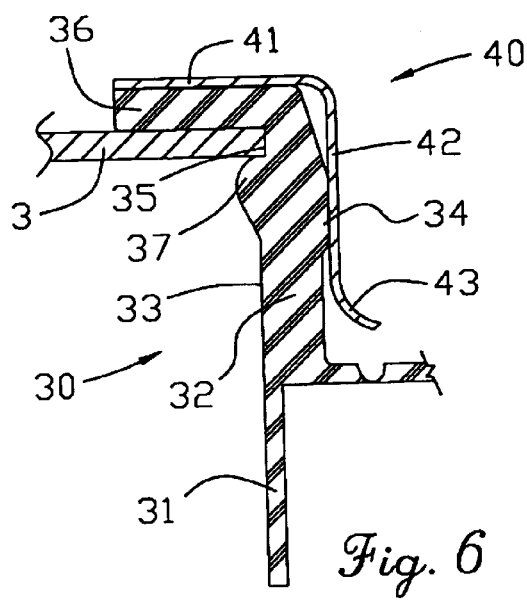

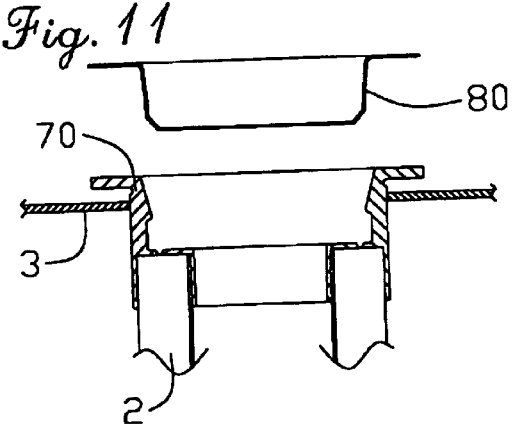
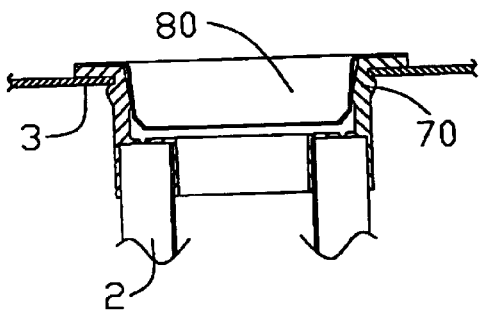
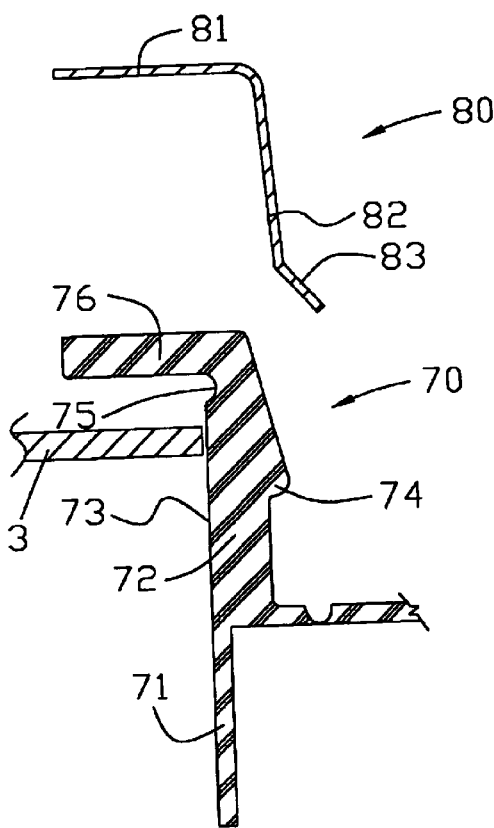
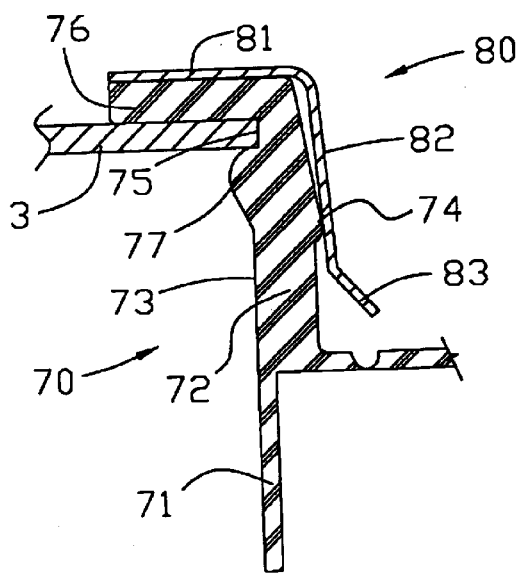

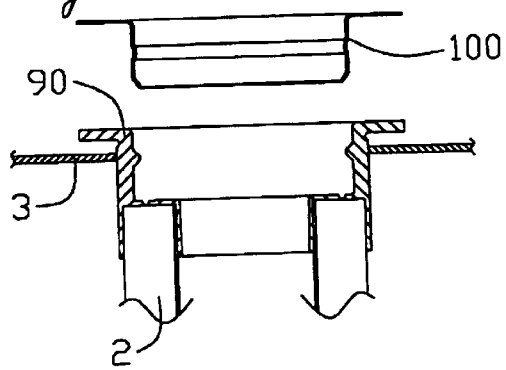
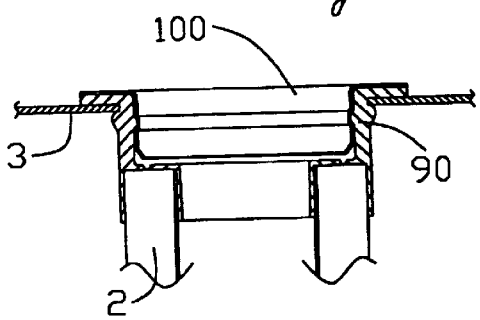
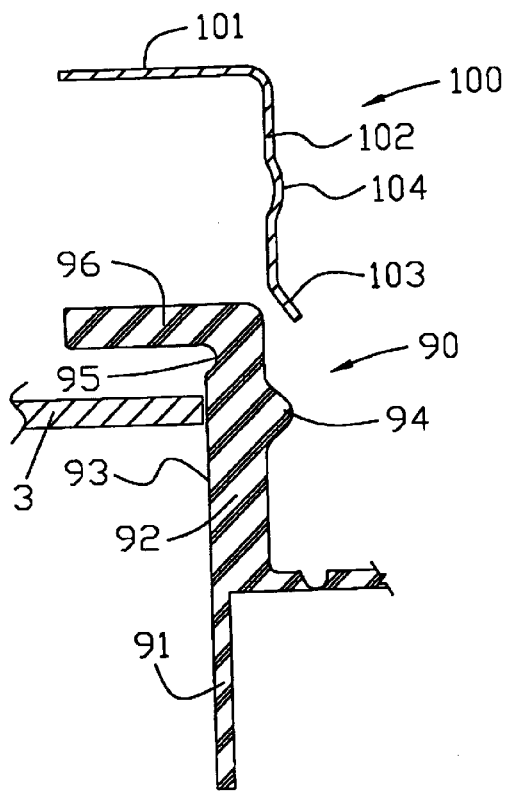
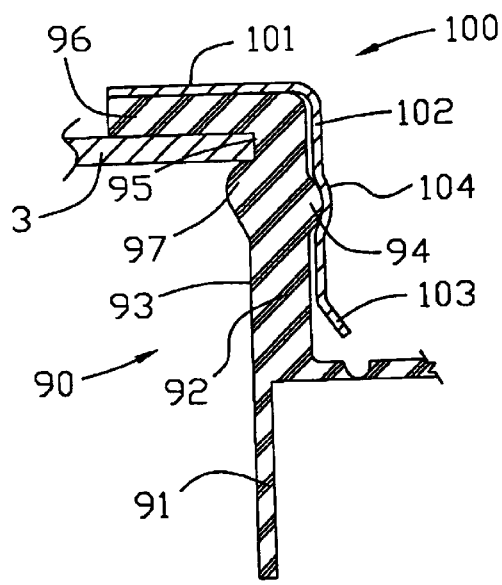

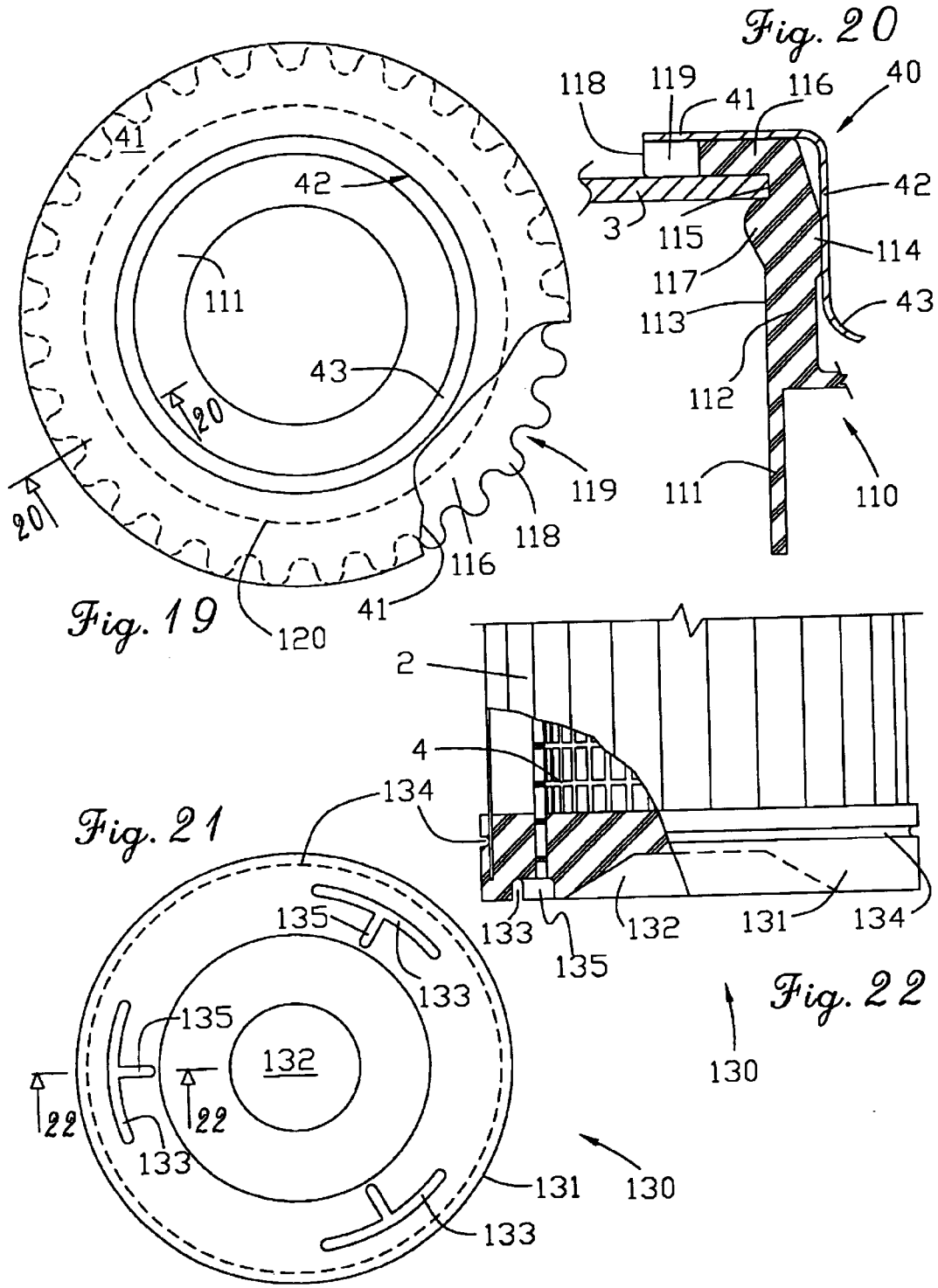

UNITARY FILTER CARTRIDGE

This application is a continuation-in-part application of our application Ser. No. 09/273,792, filed Mar. 22, 1999, now U.S. Pat. No. 6,017,378, issued Jan. 25, 2000, which is a continuation application of our application Ser. No. 08/862,552, filed May 23, 1997, now U.S. Pat. No. 5,885,314, issued Mar. 23, 1999, which is a continuation application of our application Ser. No. 08/350,885, filed Dec. 6, 1994, originally issued May 27, 1997 as U.S. Pat. No. 5,632,791 and subsequently surrendered for U.S. Pat. No. RE37,163 E, reissued May 8, 2001, which is a continuation-in-part application of our design patent application Ser. No. 29/022,499, filed May 6, 1994, now abandoned.

FIELD OF THE INVENTION

The present invention generally relates to industrial baghouses and more particularly to an air filter cartridge for removing particles or dust from a stream of air moving through the baghouse.

BACKGROUND AND SUMMARY OF THE INVENTION

Continuous emphasis on environmental quality has resulted in increasingly strenuous regulatory controls on industrial emissions. One-technique which has proven highly effective in controlling air pollution has been separation of undesirable particulate matter from a gas stream by fabric filtration. Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by a tube sheet. Disposed within openings in the tube sheet are fabric filters (also referred to as air filter cartridges). A particulate laden gas stream induced by the action of a fan, blows into one chamber (dirty air plenum) wherein dust accumulates on the fabric filter as the gas passes through the fabric into the other plenum (clean air plenum) and out an exhaust. Although all baghouses are designed in accordance with the foregoing general principles, there are numerous operation and structural distinctions including numerous differences in the structure of the air filter cartridge. The present invention relates to a baghouse wherein a plurality of cylindrical air filter cartridges having closed lower ends are vertically suspended in the dirty air plenum from the tube sheet. The upper ends of the air filter are fixed to openings in the tube sheet. Filtration of the process gas occurs from outside to inside of the filters (i.e., the dust collects on the outside surface of each air filter cartridge).

During continuous operation of the baghouse, the bags must be periodically cleaned and the accumulated dust removed. This may be done by interrupting the flow of the process gas carrying particulate matter and then causing reverse cleaning air to flow from the clean air plenum to the dirty air plenum. The reverse flow of cleaning air causes the dust cake to be dislodged and fall from the exterior of the filter cartridge to the bottom of the dirty air plenum for removal by an auger or similar means. In some baghouse installations, reverse air cleaning may also be supplemented with mechanical shaking of the filters.

Even when a filter bag is properly installed, it is reasonable to expect the fabric to stretch and deteriorate with age and with repeated cycles between the filtering and cleaning modes of operation. Thus, the filters must be periodically checked and replaced.

The installation and maintenance of filter cartridges of this type has traditionally been a time consuming and costly operation. Accordingly, there has been a long felt need in this industry for improvements in filter-cartridge assemblies and mounting techniques to alleviate the many installation and maintenance difficulties which have been encountered.

In the past, a filter cartridge has been proposed (such as in European patent publication number 0 160 168 A2) which comprises a pleated filter medium disposed between an open end cap and a closed end cap. The filter medium is woven through off-set inner and outer support wires which defined the pleated arrangement. The support wires are attached at each end to a frame within the end caps and are formed to exert pressure on the filter medium to support it against inner pressure from a pulsed jet cleaning device.

Additionally, the filter cartridge of the '168 publication utilizes a separate securing bolt inserted upward through the center of the lower end cap and secured to a threaded recess proximate the upper end cap in order to seal the cartridge to the support frame. Hence, this filter cartridge is quite difficult to install and remove.

An alternative filter cartridge has been proposed, such as in World Patent 90/11116, which attempts to minimize the amount of filtered material which passes through the filter when the pleated filter material is torn. The filter of the '116 patent discloses a pleated filter, each fold of which defines a longitudinally extending triangular pocket. A filter pipe is inserted along the interior of the pleats and constructed with continuous longitudinal ridges along a length thereof. The ridges form rib shaped elements extending along the longitudinal axis of the filter and having a triangular cross section substantially corresponding to that of the pockets formed about the interior contour of the pleats. The ridges may consist of a foam material applied to the filter pipe.

The filter cartridge of the '116 patent may be attached to a metal retaining plate through a retaining lip formed at the filter's upper end. The retaining lip includes an external annular grove about its perimeter which receives the retaining plate in order to hold the cartridge in position. The pleat pack is suspended from the retaining lip. An interior annular groove is provided proximate the external annular groove. The interior groove receives an expanding part having an expanding ridge about its perimeter. The expanding part is securely mounted to the filter pipe which is suspended therefrom. The expanding part and the retaining lip are formed as separate components. To install the filter cartridge into the support frame, the expanding part and filter pipe are removed from the retaining lip to allow the retaining lip to compress inward and pass through an opening in the lower end of the retaining plate. Once the retaining plate is received within the outer notch of the retaining lip, the expanding part is inserted upward through the pleat pack with the filter pipe oriented such that the pipe folds aligning with the ridges about the pleat.

An alternative filter cartridge has been proposed, in European patent (EP 0 498 757 A1), which is intended to prevent build up of dirt particles about the bottom end of the filter cartridge. To achieve this objective, the cartridge of the '757 patent forms a lower end cap which substantially follows the star shaped pattern of the pleats. The filter cartridge of the '757 patent is manufactured by placing the filter star tightly upon a base plate. A liquid compound, which when hardened will form the bottom end cap, is applied to the sealed base plate, within the filter star. The liquid material flows into the inner recesses in the filter star to fill the inner radial folds of the star-shaped pleats.

However, the systems proposed heretofore have experienced disadvantages. In particular, the filter cartridges of the '116 patent and '168 publication require unduly complex structures having multiple parts which must be assembled before the cartridges are inserted. Such assembly is extremely difficult. Further, the filter cartridge of the '168 publication utilizes a bottom end cap which bridged the spaces between adjoining pleats within the filter medium, thereby forming a ledge about the bottom of the filter cartridge. This ledge collects dust and filtered material which clogs the lower end of the filter cartridge.

The cartridge of the '116 patent utilizes an inner cage having triangular shaped ridges extending longitudinally there along about its perimeter. To insert this cage, and the expanding part on the top end thereof, each of the triangular ridges must be aligned with a corresponding triangular recess in the perimeter of the pleats. This alignment is extremely difficult. Moreover, to remove the filter cartridge of the '116 patent, the retaining part and the cage must first be removed before the pleats can be removed. This operation undesirably complicates the filter changing process.

The cartridge of the '757 patent requires an overly complex manufacturing process. Additionally, the filter of the '757 patent utilizes an inner cage within the filter element which is permanently secured to rigid top and bottom end caps. Hence, the filter of the '757 patent exhibits an extremely rigid structure encompassing both end caps, thereby requiring separate securing means to attach the filter to the system. The separate securing means increase the number of parts and necessitate unduly complex installation and removal processes.

It is an object of the present invention to overcome the problems experienced by the foregoing systems.

More particularly, an object of the invention is to provide a pleat pack filter cartridge of a unitary construction for installation in the tube sheet of a baghouse. Opposite ends of the pleat pack are integrally received within a bottom end cap and an upper fitting. The bottom end cap may be molded to follow the contour of the pleat pack, or may be molded as a disk with an inwardly projecting groove to centrally align the pleat pack therein. The upper fitting is formed of a resiliently flexible material and includes an upper flange to overlie and seal with the upper surface of the tube sheet, a tube sheet mouth insert to seal with a circular opening in the tube sheet, a contoured transition to seal with the lower surface of the tube sheet, and a lower cylindrical collar which permanently secures the upper end of the filter. The contoured transition of the fitting is alternatively molded with either an exterior bulge or an interior bulge. The transition with an exterior bulge is resiliently deformed inwardly to pass through the circular opening of the tube sheet during installation. The transition with an interior bulge freely passes through the circular opening of the tube sheet during installation and then receives an expander to outwardly deform the material to seal with the lower surface of the tube sheet. The upper flange of the fitting may be formed as circumferential scallop edge to facilitate tool access for removal of the expander.

DETAILED DESCRIPTION OF THE DRAWINGS

The objects and features of the invention noted above are explained in more detail with reference to the drawings, in which like reference numerals denote like elements, and in which:

FIG. 1 is a perspective elevational view of a filter cartridge constructed in accordance with one embodiment of the invention;

FIG. 2 is an enlarged, side elevational view of the filter cartridge shown in FIG. 1 with portions thereof broken away and in cross section to better illustrate the details of construction when the filter cartridge is fully installed and sealed against the tube sheet;

FIG. 3 is an exploded, side sectional view of the upper end of a filter cartridge constructed in accordance with a second embodiment of the invention prior to installation in the tube sheet;

FIG. 4 is a side sectional view of the filter cartridge shown in FIG. 3 fully installed and sealed against the tube sheet;

FIG. 5 is an enlarged, fragmentary exploded view of a portion of the filter cartridge shown in FIG. 3 to better illustrate the details of construction;

FIG. 6 is an enlarged, fragmentary view of a portion of the installed filter cartridge shown in FIG. 4;

FIG. 11 is an exploded, side sectional view of the upper end of a filter cartridge constructed in accordance with a fourth embodiment of the invention prior to installation in the tube sheet;

FIG. 12 is a side sectional view of the filter cartridge shown in FIG. 11 fully installed and sealed against the tube sheet;

FIG. 13 is an enlarged, fragmentary exploded view of a portion of the filter cartridge shown in FIG. 11 to better illustrate the details of construction;

FIG. 14 is an enlarged, fragmentary view of a portion of the installed filter cartridge shown in FIG. 12;

FIG. 15 is an exploded, side sectional view of the upper end of a filter cartridge constructed in accordance with a fifth embodiment of the invention prior to installation in the tube sheet;

FIG. 16 is a side sectional view of the filter cartridge shown in FIG. 15 fully installed and sealed against the tube sheet;

FIG. 17 is an enlarged, fragmentary exploded view of a portion of the filter cartridge shown in FIG. 15 to better illustrate the details of construction;

FIG. 18 is an enlarged, fragmentary view of a portion of the installed filter cartridge shown in FIG. 16;

FIG. 19 is a top plan view of an installed filter cartridge with a portion thereof broken away to better illustrate the details of a new alternative configuration of the upper flange;

FIG. 20 is an enlarged, fragmentary view of a portion of the filter cartridge taken along line 20—20 of FIG. 19 in the direction of the arrows;

Figure 7:
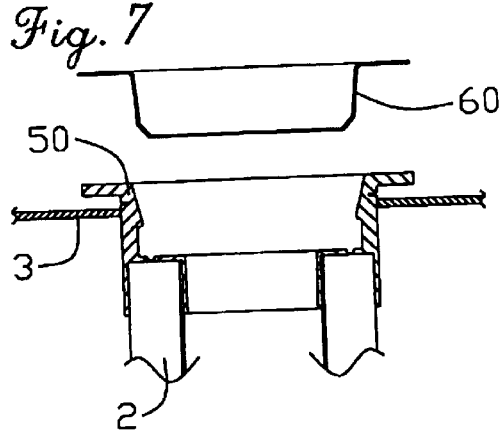
FIG. 7 is an exploded, side sectional view of the upper end of a filter cartridge constructed in accordance with a third embodiment of the invention prior to installation in the tube sheet.

FIG. 21 is a bottom plan view of the lower end cap of a filter cartridge having a new alternative configuration for the lower end cap to align the pleat pack therewith; and FIG. 22 is an side elevational view of the lower end cap of a filter cartridge as shown in FIG. 21 with portions thereof broken away and in cross section to better illustrate the details of construction generally along line 22—22 of FIG. 21 in the direction of the arrows.

DETAILED DESCRIPTION OF THE INVENTION

FIG. 1 generally illustrates one preferred embodiment of a filtered cartridge according to the present invention as designated by the reference numeral 1. The filter cartridge 1 is received within a tube sheet 3 having an opening 5 therethrough with a diameter D. The cartridge 1 filters particulate material from a process fluid such as particulate laden gas as the gas passes radially inward through the cartridge 1 and upward through the opening 5. The filter cartridge 1 includes a pleat pack 2 (also referred to as a filter sheet or filter medium) formed in a substantially tubular shape about a filtered chamber with accordion folds about a perimeter thereof The pleat pack 2 may be constructed of any conventionally known filtering medium. Each fold is constructed with outer filter walls 10 extending along the length of the cartridge 1. Adjoining filter walls 10 form internal and external V-shaped voids 11 and 12.

The pleat pack is formed about, and abuts firmly against, a tubular inner screen 4 having a rectangular mesh pattern therethrough. The inner screen 4 may be constructed of any conventionally used screening medium, such as plastic, metal and the like. The inner screen 4 is constructed in a tubular shape and extends along a substantial majority of the length of the pleat pack 2. Upper and lower ends or rims of the pleat pack 2 and inner screen 4 are securely received within a top support sleeve or fitting 8 (FIG. 2) and a bottom end cap 6. The bottom end cap 6 and the upper fitting 8 are moldably and integrally formed with the pleat pack 2 and screen 4 as will be explained in more detail below. The top fitting 8 represents an encasement which defines a discharge port from the filtered chamber through the opening 5.

The bottom end cap 6 includes an outer rim 9 which may be formed to the exterior of the pleat pack 2 and following the contour of the filter walls 10. The outer rim 9 is formed when the potting material forming the end cap 6 passes through the lower end of the screen 4 and through the pleat pack 2. The outer rim 9 is joined integrally with the end cap 6 through the pleat pack 2. The bottom end cap 6 may be formed of a conventionally known resilient material, so long as it affords sufficient rigidity to support the pleat pack 2 and inner screen 4. For instance, the bottom end cap 6 may be formed of urethane, polyurethane, fluorocarbons, silicon compounds and the like. By way of example, the bottom end cap 6 may be formed of urethane material having a resiliency with a durometer reading broadly within a shore A range of 30–70 and preferably between 50–65.

The top fitting 8 may be constructed of urethane, polyurethane, fluorocarbons, silicon compounds and the like, so long as the material forming the top fitting 8 affords sufficient softness to be manually deformed. More specifically, the top fitting 8 should be constructed of flexible material having a durometer reading of no greater than 70 shore A. By way of example, the top fitting 8 should be formed of urethane having a durometer reading within shore A 30–70 and preferably 50–65, and optimally of approximately 50 shore A. If the durometer measurement of the material exceeds its upper limit, the top fitting becomes too rigid and unduly difficult to manually deform for installation. The flexibility of the top fitting 8 may vary depending upon the dimensions thereof (as explained below).

FIG. 2 illustrates the cross-section of one embodiment of the upper fitting 8 in more detail. Beginning at its bottom, the fitting 8 includes inner and outer lower rims 14 and 17 extending downward about the interior and exterior surfaces of the upper end of the inner screen 4 and pleat pack 2. The inner rim 14 includes knobs 15 projecting outward therefrom and securely engaging the openings within the mesh pattern of the upper portion of the screen 4. In this manner, the top fitting 8 is securely retained to the inner screen 4. The outer rim 17 penetrates and securely engages the pleat pack 2. The inner and outer rims 14 and 17 of the top fitting 8 are integrally formed with one another and with a lateral ledge 16 extending radially outward over the top of the screen 4 and over the upper end of the filter walls 10. The outer rim 17, lateral ledge 16 and inner rim 14 thus form a lower cylindrical collar to encase and secure the upper end of the pleat pack 2 and screen 4.

A transition piece or funnel shaped side wall 20 is formed integrally with the lateral ledge 16 and projects vertically upward and radially outward therefrom. The funnel shaped side wall 20 extends beyond the upper ends of the pleat pack 2 and the inner screen 4. Means is provided above the exterior surface 22 of the side wall 20 to secure the cartridge 1 to the tube sheet 3 as by a tube sheet mouth insert, such as a receiving groove 24. The center of the groove 24 is located at a predefined height H above the top of the filter wall 10 of the pleat pack 2. The uppermost end of the side wall 20 is flared radially outward to form an upper flange or supporting ledge 26 immediately above and adjacent the groove 24. The groove 24 extends about the perimeter of the side wall 20 and is formed to receive the edge of the opening 5 within the tube sheet 3. The supporting ledge 26 extends radially outward beyond the side wall 20 to securely engage the upper surface of the tube sheet 3.

The top fitting 8 is configured to ensure easy removal of the cartridge 1 from the tube sheet 3. This removal is achieved by constructing the top fitting 8 from a material having a maximum amount of resiliency and by ensuring that the height H remains within a predefined relation (H/D) to the diameter D of the opening 5 in the tube sheet 3. Specifically, the relation $0.3<H/D<0.85$ should be maintained, while the relation $0.3<H/D<0.75$ is preferable and $H/D\approx0.7$ is optimal, where H corresponds to the vertical distance between the top edge of the filter wall 10 of the pleat pack 2 and the center of the groove 24 and the diameter D corresponds to that of the opening 5 in the tube sheet 3.

The groove 24 may be constructed with a depth having an inner diameter slightly greater than the diameter of the opening 5 in the tube sheet, such that the top fitting 8 must remain slightly compressed when the fitting 8 is snugly fit into the opening 5. This diameter variation maintains a sealed relation between the filter cartridge 1 and tube sheet 3.

Optionally, a separate resilient band which is spring tempered such as a stainless steel band and the like, may be constructed with an outer diameter substantially equal to or slightly greater than the inner diameter of the top fitting 8 proximate the grooves 24 (i.e., at point 23). This band may be easily deformed (i.e., by twisting it to construct a figure eight shape) and inserted into the interior of the top fitting 8. The band is allowed to expand to its circular form, at which it snugly engages the interior wall 23 of the top fitting 8. This band increases the sealing pressure against the side wall 20 to ensure that the grooves 24 properly seat against the opening 5. This design insures that the cartridge 1 is capable of use with openings 5 which have not been precisely cut to correspond to the diameter of the groove 24.

To effect installation and removal of the cartridge 1, a maintenance person grasps the cartridge 1 and applies radial pressure inward against the side wall 20 immediately adjacent the tube sheet 3. As the side wall 20 collapses radially inward, the groove 24 and ledge 26 similarly collapse inward away from the edge of the opening 5 in the tube sheet 3. The side wall 20 is collapsed inward until a sufficiently large section of the ledge 26 and groove 24 clear the tube sheet 3 to allow removal of the cartridge 1. Next, the maintenance person merely pries the cartridge 1 to one side, in order to disengage the remaining portion of the groove 24 and ledge 26 away from the tube sheet 3.

Hereafter, a method of manufacturing the foregoing cartridge will be explained.

Initially, the lower end of the pleat pack 2 and screen 4 are dipped in liquid urethane, and the like which acts as a bonding agent to bond the material forming the bottom end cap and the pleat pack. Thereafter, the pleat pack 2 and screen 4 are positioned within a mold having an exterior contour substantially conforming to the desired shape of the pleat pack 2 (i.e., a star or accordion shape). Next, a potting urethane, polyurethane, fluorocarbon, or silicon compound and the like is injected into the mold within the screen 4 and directed radially outward therethrough and outward, through the pleat pack 2. As the potting compound flows outward through the screen 4 and pleat pack 2, it contacts the bonding agent and seats therewith. The potting compound adheres to the screen 4 and pleat pack 2 and hardens to form the bottom end cap. In this manner, the potting compound completely encloses and surrounds the inner and outer surfaces. The mold, which follows the outer contour of the filter walls 10, maintains the potting compound in an accordion or star shape once it flows through the filter wall 10. This pattern prevents the formation of a bottom end cap which bridges the pleats thereby avoiding the collection of dirt about the bottom of the filter while maintaining a secure connection between the pleat pack 2, inner screen 4, and bottom end cap 6. Optionally, the dipping step may be omitted if a sufficient bond is obtained with the pleat pack and screen.

The foregoing process is repeated to produce the top fitting, except that the upper end of the pleat pack 2 and inner screen 4 are inserted into a mold conforming to the desired inner and outer contours of the top fitting 8 as described above in connection with FIG. 2. The top ends of the pleat pack 2 and screen 4 are not necessarily dipped in liquid urethane before being placed in the mold. Thereafter, the potting compound is injected into the interior of the screen and flows outward through the screen and pleat pack to form the inner and outer rims 14 and 17, and the lateral ledge 16.

It is to be understood that the present invention is not limited to the particular embodiment illustrated in FIGS. 1 and 2. For instance, the present filter may be constructed from a variety of shapes, sizes and configurations. For instance, the instant filter and top fitting may be formed in an oval shape, a rectangular shape, a multi-sided shape and the like, so long as the upper fitting 8 is formed of sufficiently flexible material and configuration to be manually removed from the tube sheet 3. Moreover, the filter cartridge need not necessarily include a solid bottom end cap. Instead, the filter cartridge may be constructed with a bottom portion formed of filtering medium, such as if the filter were formed in a spherical shape, egg shape and the like so long as the filtering medium provided at least one discharge port proximate the fitting 8. Further, both ends of the filter cartridge may be provided with discharge ports enclosed within top and bottom fittings, both of which resemble fitting 8.

Moreover, the top fitting 8 need not include a funnel shaped side wall 20, but instead may include a side wall having any desirable shape so long as the side wall engages the tube sheet 3 at a height H above the top of the inner screen 4. As explained above, the height H between the top of the inner screen 4 and the center of the groove 24 which intersects the tube sheet 3 must maintain a desired relation to the diameter D of the opening 5 in the tube sheet 3 which facilitates manual deflection of the top fitting 8.

Further, the top fitting 8 need not necessarily include a single groove 24 as means for adjoining the opening 5. Instead, the tube sheet 3 and the side wall 20 may include correspondingly contoured surfaces so long as a seal is maintained. For instance, the opening 5 and side wall 20 may include multiple ribs and multiple grooves aligned with one another. Further, the groove 24 may be formed with any desired cross-section, such as rectangular notches and the like. The intersecting surfaces between the top fitting 8 and tube sheet 3 may alternatively be provided with a screw type groove arrangement which allows the filter cartridge to be screwed into the tube sheet 3. As the surface area of the contacting surfaces between the top fitting 8 and tube sheet 3 increases (i.e. such as by the inclusion of multiple grooves and recesses upon each component), the top fitting 8 may be formed of a material having more flexibility. This decreases the need for resiliency due to the increased surface area contact between the filter cartridge and the tube sheet. Hence a more easily deformed cartridge may be provided, while maintaining a sufficient seal with the tube sheet 3.

Representative examples of some of the foregoing modifications and alternatives contemplated by this invention are illustrated in FIGS. 3–18 of the drawings.

Attention is first directed to the exploded view of FIG. 3 showing the upper end of a filter cartridge constructed in accordance with a second embodiment of the invention during the installation operation. FIG. 4 illustrates the full installation of the cartridge in the tube sheet 3. The filter cartridge includes an upper fitting 30 molded of resiliently flexible material to the upper end of the filter pack 2. During installation, an expander 40 is inserted into the mouth of the fitting 30 to affect sealing engagement of the fitting 30 with the tube sheet 3.

Additional details of construction can be better understood with reference to the corresponding enlarged fragmentary views of FIGS. 5 & 6. Beginning at the lower end of the fitting 30 is a cylindrical collar 31 which encases the upper end of the filter pack (not shown, but as previously described). Integrally joined to and extending upwardly from the cylindrical collar 31 is a contoured transition section 32 having a cylindrical outer wall 33 of a diameter substantially equal to or less than the diameter of the circular opening in the tube sheet 3, and also having an inwardly projecting bulbous wall 34. Integrally joined to the upper region of the transition 32 is a tube sheet mouth insert 35 which has a height substantially equal to the thickness of the tube sheet 3 and which has a diameter that substantially corresponds to the diameter of the circular opening in the tube sheet 3. Lastly, integrally joined to the mouth insert 35 is an upper flange 36 which completes the fitting 30 and overlies the upper surface of the tube sheet 3 when installed.

The tubular expander 40, as illustrated in FIGS. 5 & 6, is preferably formed as a single, integral member. The expander 40 includes a rigid, centrally open flange ring 41 to overlie the flange 36 of the fitting 30, and an insertable band formed as a cylindrical, vertical wall 42 having an outer diameter less than or equal to the mouth of the fitting 30 but, most importantly, being greater in diameter than the projecting bulbous wall 34 of the fitting 30. The lower end of the wall 42 terminates in an inwardly curved shoulder 43. The shoulder 43 forms the lowermost opening of the expander 40 and is greater in diameter than the inner passage through the filter pack in order not to present a restriction to process gas discharged to the clean air plenum.

In operation, the filter cartridge having a upper fitting 30 is inserted into the circular opening in the tube sheet 3. This may be accomplished from above by inserting the bottom end cap of the filter cartridge through the opening in the tube sheet and lowering the cartridge into place until the flange 36 rests on the upper surface of the tube sheet 3. From below, the cartridge may be installed by manually deforming the fitting 30 until the flange 36 may be passed through the opening in the tube sheet. The flange 36 will spring back into position to overlie the tube sheet when it passes the opening. To complete installation, the expander 40 is inserted into the mouth of the fitting 30 from above and lowered until the shoulder 43 contacts the interior surface of the transition section 32. At this point, the workman typically steps on the ring flange 41 to fully seat the expander 40 into the fitting 30 as shown in FIGS. 4 & 6. This action causes the wall 42 to outwardly bias the bulbous wall 34 to create a corresponding bulge 37 in the outer dimension of the transition 32 just below the opening in the tube sheet in order to contact the lower surface of the tube sheet 3. Correctly installed, therefore, the fitting 30 contacts and seals with the upper surface of the tube sheet adjacent the circular opening, with the cylindrical mouth surface of the tube sheet opening, and with the lower surface of the tube sheet adjacent the circular opening.

To effect removal or uninstall the filter cartridge from the tube sheet, the expander 40 is first withdrawn from the inside of the fitting 30. From above, the cartridge can then be simply lifted from the opening in the tube sheet. From below, the flange 36 of the fitting 30 must be manually deformed to pass through the opening in the tube sheet.

Figure 8:
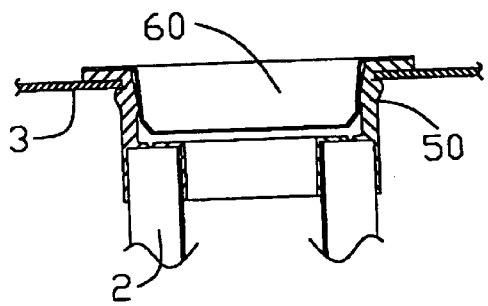
FIG. 8 is a side sectional view of the filter cartridge shown in FIG. 7 fully installed and sealed against the tube sheet.

Attention is next directed to the exploded view of FIG. 7 showing the upper end of a filter cartridge constructed in accordance with a third embodiment of the invention during the installation operation. FIG. 8 illustrates the full installation of the cartridge in the tube sheet 3. The filter cartridge includes an upper fitting 50 molded of resiliently flexible material to the upper end of the filter pack 2. During installation, an expander 60 is inserted into the mouth of the fitting 50 to affect sealing engagement of the fitting 50 with the tube sheet 3.

Figure 9:
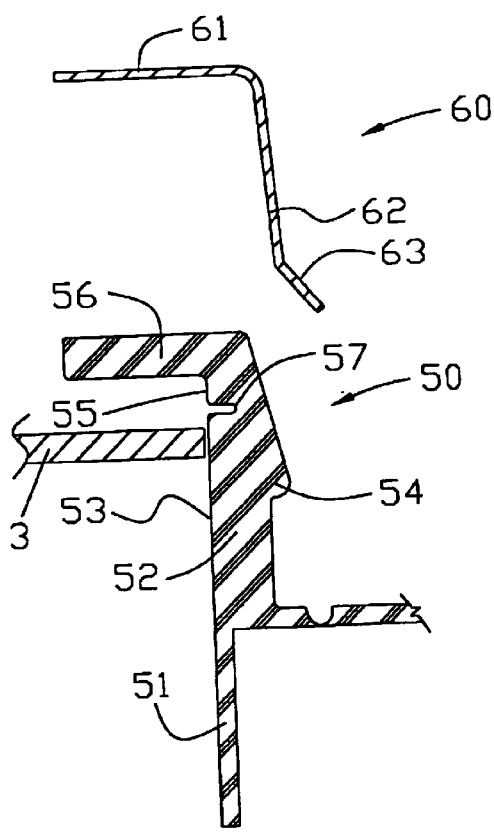
FIG. 9 is an enlarged, fragmentary exploded view of a portion of the filter cartridge shown in FIG. 7 to better illustrate the details of construction.
Figure 10:
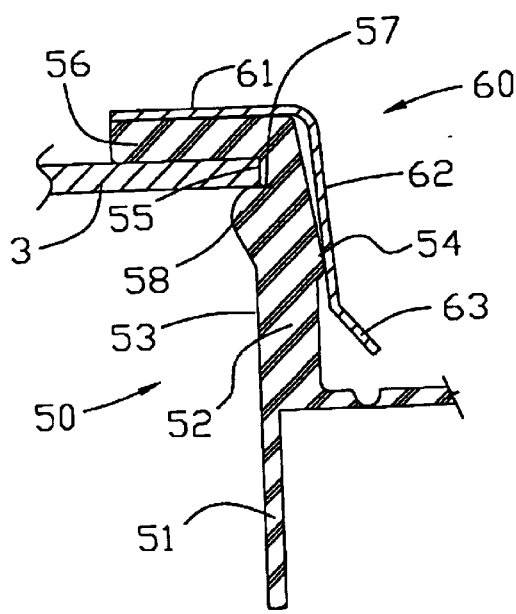
FIG. 10 is an enlarged, fragmentary view of a portion of the installed filter cartridge shown in FIG. 8.

Additional details of construction can be better understood with reference to the corresponding enlarged fragmentary views of FIGS. 9 & 10. Beginning at the lower end of the fitting is a cylindrical collar 51 which encases the upper end of the filter pack (not shown, but as previously described). Integrally joined to and extending upwardly from the cylindrical collar 51 is a contoured transition section 52 having a cylindrical outer wall 53 of a diameter substantially equal to or less than the diameter of the circular opening in the tube sheet 3, and also having an inwardly projecting bulbous wall 54. Integrally joined to the upper region of the transition 52 is a tube sheet mouth insert 55 which has a height substantially equal to the thickness of the tube sheet 3 and which has a diameter that substantially corresponds to the diameter of the circular opening in the tube sheet 3. Immediately beneath the mouth insert 55 the transition 52 includes a circumferential groove 57. Lastly, integrally joined to the mouth insert 55 is an upper flange 56 which completes the fitting 50 and overlies the upper surface of the tube sheet 3 when installed.

An alternative tubular expander 60 is illustrated in FIGS. 9 & 10 and is preferably formed as a single, integral member. The expander 60 includes a rigid, centrally open flange ring 61 to overlie the flange 56 of the fitting 50, and an insertable band formed as a tapered funnel wall 62 having a maximum outer diameter less than or equal to the mouth of the fitting 50 but, most importantly, also having an intermediate diameter greater than the projecting bulbous wall 54 of the fitting 50. The lower end of the wall 62 terminates in an inwardly tapered neck 63. The neck 63 forms the lowermost opening of the expander 60 and is greater in diameter than the inner passage through the filter pack in order not to present a restriction to process gas discharged to the clean air plenum.

In operation, the filter cartridge having a upper fitting 50 is inserted into the circular opening in the tube sheet 3. This may be accomplished from above by inserting the bottom end cap of the filter cartridge through the opening in the tube sheet and lowering the cartridge into place until the flange 56 rests on the upper surface of the tube sheet 3. From below, the cartridge may be installed by manually deforming the fitting 50 until the flange 56 may be passed through the opening in the tube sheet. The flange 56 will spring back into position to overlie the tube sheet when it passes the opening. To complete installation, the expander 60 is inserted into the mouth of the fitting 50 from above and lowered until the neck 63 or tapered wall 62 contacts the interior surface of the transition section 52. At this point, the workman typically steps on the ring flange 61 to fully seat the expander 60 into the fitting 50 as shown in FIGS. 8 & 10. This action causes the wall 62 to outwardly bias the bulbous wall 54 to create a corresponding bulge 57 in the outer dimension of the transition 52 just below the opening in the tube sheet in order to contact the lower surface of the tube sheet 3. The circumferential groove 57 permits the bulge 57 to form more easily and to accommodate shear forces within the material of the transition piece 52. Correctly installed, therefore, the fitting 50 contacts and seals with the upper surface of the tube sheet adjacent the circular opening, with the cylindrical mouth surface of the tube sheet opening, and with the lower surface of the tube sheet adjacent the circular opening.

To effect removal or uninstall the filter cartridge from the tube sheet, the expander 60 is first withdrawn from the inside of the fitting 50. From above, the cartridge can then be simply lifted from the opening in the tube sheet. From below, the flange 56 of the fitting 50 must be manually deformed to pass through the opening in the tube sheet.

Attention is next directed to the exploded view of FIG. 11 showing the upper end of a filter cartridge constructed in accordance with a fourth embodiment of the invention during the installation operation. FIG. 12 illustrates the full installation of the cartridge in the tube sheet 3. The filter cartridge includes an upper fitting 70 molded of resiliently flexible material to the upper end of the filter pack 2. During installation, an expander 80 is inserted into the mouth of the fitting 70 to affect sealing engagement of the fitting 70 with the tube sheet 3.

Additional details of construction can be better understood with reference to the corresponding enlarged fragmentary views of FIGS. 13 & 14. Beginning at the lower end of the fitting 70 is a cylindrical collar 71 which encases the upper end of the filter pack (not shown, but as previously described). Integrally joined to and extending upwardly from the cylindrical collar 71 is a contoured transition section 72 having a cylindrical outer wall 73 of a diameter substantially equal to or less than the diameter of the circular opening in the tube sheet 3, and also having an inwardly projecting bulbous wall 74. Integrally joined to the upper region of the transition 72 is a tube sheet mouth insert groove 75 which has a height substantially equal to the thickness of the tube sheet 3 and which has a diameter at the bottom of the groove slightly less than the diameter of the circular opening in the tube sheet 3. Lastly, integrally joined to the mouth insert 75 is an upper flange 76 which completes the fitting 70 and overlies the upper surface of the tube sheet 3 when installed.

The tubular expander 80, as illustrated in FIGS. 13 & 14, is of the same configuration as shown in FIGS. 9 & 10. The expander 80 includes a rigid, centrally open flange ring 81 to overlie the flange 76 of the fitting 70, and an insertable band formed as a tapered funnel wall 82 having a maximum outer diameter less than or equal to the mouth of the fitting 70 but, most importantly, also having an intermediate diameter greater than the projecting bulbous wall 74 of the fitting 70. The lower end of the wall 82 terminates in an inwardly tapered neck 83. The neck 83 forms the lowermost opening of the expander 80 and is greater in diameter than the inner passage through the filter pack in order not to present a restriction to process gas discharged to the clean air plenum.

In operation, the filter cartridge having a upper fitting 70 is inserted into the circular opening in the tube sheet 3. This may be accomplished from above by inserting the bottom end cap of the filter cartridge through the opening in the tube sheet and lowering the cartridge into place until the flange 76 rests on the upper surface of the tube sheet 3. From below, the cartridge may be installed by manually deforming the fitting 70 until the flange 76 may be passed through the opening in the tube sheet. The flange 76 will spring back into position to overlie the tube sheet when it passes the opening. To complete installation, the expander 80 is inserted into the mouth of the fitting 70 from above and lowered until the neck 83 or tapered wall 82 contacts the interior surface of the transition section 72. At this point, the workman typically steps on the ring flange 81 to fully seat the expander 80 into the fitting 70 as shown in FIGS. 12 & 14. This action causes the wall 82 to outwardly bias the bulbous wall 74 to create a corresponding bulge 77 in the outer dimension of the transition 72 just below the opening in the tube sheet in order to contact the lower surface of the tube sheet 3. The circumferential groove 75 permits the bulge 77 to form more easily and to accomodate shear forces within the material of the transition piece 72 although the seal between the circular opening of the tube sheet and the material forming the groove 75 may be slightly less effective than the configuration of FIGS. 5 & 6. Correctly installed, therefore, the fitting 70 contacts and seals with the upper surface of the tube sheet adjacent the circular opening, with the cylindrical mouth surface of the tube sheet opening, and with the lower surface of the tube sheet adjacent the circular opening.

To effect removal or uninstall the filter cartridge from the tube sheet, the expander 80 is first withdrawn from the inside of the fitting 70. From above, the cartridge can then be simply lifted from the opening in the tube sheet. From below, the flange 76 of the fitting 70 must be manually deformed to pass through the opening in the tube sheet.

Attention is lastly directed to the exploded view of FIG. 15 showing the upper end of a filter cartridge constructed in accordance with a fifth embodiment of the invention during the installation operation. FIG. 16 illustrates the full installation of the cartridge in the tube sheet 3. The filter cartridge includes an upper fitting 90 molded of resiliently flexible material to the upper end of the filter pack 2. During installation, an expander 100 is inserted into the mouth of the fitting 90 to affect sealing engagement of the fitting 90 with the tube sheet 3.

Additional details of construction can be better understood with reference to the corresponding enlarged fragmentary views of FIGS. 17 & 18. Beginning at the lower end of the fitting 90 is a cylindrical collar 91 which encases the upper end of the filter pack (not shown, but as previously described). Integrally joined to and extending upwardly from the cylindrical collar 91 is a contoured transition section 92 having a cylindrical outer wall 93 of a diameter substantially equal to or less than the diameter of the circular opening in the tube sheet 3, and also having an inwardly and sharply projecting ridge 94. Integrally joined to the upper region of the transition 92 is a tube sheet mouth insert groove 95 which has a height substantially equal to the thickness of the tube sheet 3 and which has a diameter at the bottom of the groove slightly less than the diameter of the circular opening in the tube sheet 3. Lastly, integrally joined to the mouth insert 95 is an upper flange 96 which completes the fitting 90 and overlies the upper surface of the tube sheet 3 when installed.

The tubular expander 100, as illustrated in FIGS. 17 & 18, is preferably formed as, a single, integral member. The expander 100 includes a rigid, centrally open flange ring 101 to overlie the flange 96 of the fitting 90, and an insertable band formed as a cylindrical, vertical wall 102 having an outer diameter less than or equal to the mouth of the fitting 90 but, most importantly, being greater in diameter than the projecting ridge 94 of the fitting 90. Intermediate the vertical extent of the wall 102 is a circumferential dimple 104. The lower end of the wall 102 terminates in an inwardly tapered neck 103. The neck 103 forms the lowermost opening of the expander 100 and is greater in diameter than the inner passage through the filter pack in order not to present a restriction to process gas discharged to the clean air plenum.

In operation, the filter cartridge having a upper fitting 90 is inserted into the circular opening in the tube sheet 3. This may be accomplished from above by inserting the bottom end cap of the filter cartridge through the opening in the tube sheet and lowering the cartridge into place until the flange 96 rests on the upper surface of the tube sheet 3. From below, the cartridge may be installed by manually deforming the fitting 90 until the flange 96 may be passed through the opening in the tube sheet. The flange 96 will spring back into position to overlie the tube sheet when it passes the opening. To complete installation, the expander 100 is inserted into the mouth of the fitting 90 from above and lowered until the neck 103 contacts the interior surface of the ridge 94 of the transition section 92. At this point, the workman typically steps on the ring flange 101 to fully seat the expander 100 into the fitting 90 as shown in FIGS. 16 & 18. This action causes the wall 102 to outwardly bias the ridge 94 to create a corresponding bulge 97 in the outer dimension of the transition 92 just below the opening in the tube sheet in order to contact the lower surface of the tube sheet 3. The now compressed ridge 94 is received in the circumferential dimple 104 of the expander 100 to improve the locking fit between the expander 100 and the fitting 90. Correctly installed, therefore, the fitting 90 contacts and seals with the upper surface of the tube sheet adjacent the circular opening, with the cylindrical mouth surface of the tube sheet opening, and with the lower surface of the tube sheet adjacent the circular opening.

To effect removal or uninstall the filter cartridge from the tube sheet, the expander 100 is first withdrawn from the inside of the fitting 90. From above, the cartridge can then be simply lifted from the opening in the tube sheet. From below, the flange 96 of the fitting 90 must be manually deformed to pass through the opening in the tube sheet.

Since the initial development of filter cartridges constructed in accordance with the foregoing principles, we have developed additional improvements in the design and fabrication in order to further facilitate baghouse maintenance and enhance manufacturing techniques.

After prolonged use in the baghouse environment, maintenance workers occasionally experience difficulty in the removal of the expander from the upper fitting of the filter cartridge. FIGS. 19 & 20 are directed to an improved fitting 110 to facilitate removal of the expander associated therewith. The expander 40 illustrated is of the same configuration as previously shown in FIG. 6. It includes an upper flange ring 41 and a cylindrical vertical wall 42 which terminates in a curved shoulder 43.

The improved fitting 110 of FIGS. 19 & 20, beginning at the lower end thereof, includes a cylindrical collar 111 which encases the upper end of the filter pack (not shown, but as previously described). Integrally joined to and extending upwardly from the cylindrical collar 111 is a contoured transition section 112 having a cylindrical outer wall 113 of a diameter substantially equal to or less than the diameter of the circular opening in the tube sheet 3, and also having an inwardly projecting bulbous wall 114 which maybe resiliently deformed outwardly by the expander 40 to create a bulge 117 which seals with the underside of the tube sheet 3 during installation. Integrally joined to the upper region of the transition 112 is a tube sheet mouth insert 115 which has a height substantially equal to the thickness of the tube sheet 3 and which has a diameter that substantially corresponds to the diameter of the circular opening in the tube sheet 3. Lastly, integrally joined to the mouth insert 115 is an upper flange 116 which completes the fitting 110 and overlies the upper surface of the tube sheet 3 when installed.

The upper flange 116 is specially contoured, however, to include an outer peripheral scallop edge molded as projections 118 separated with uniformly spaced voids 119 therebetween to provide a tool access between the flange ring 41 of the expander 40 and the upper surface of the tube sheet 3 to facilitate a prying technique in the removal of the expander 40 from engagement within the fitting 110. In forming the upper flange 116 in this manner it is important to note that the innermost region of the flange 116 is continuous and uninterrupted adjacent the circular opening of the tube sheet in order to affect a continuous seal with the upper surface of the tube sheet proximate the circular opening. This relationship can be better understood with reference to the hidden line circle 120 of FIG. 19 representing the circular tube sheet opening beneath the upper flange 116. In other words, the voids 119 do not extend so far into the flange 116 from the outer diameter thereof to interfere with an effective sealing engagement adjacent the circular opening.

FIGS. 21 & 22 are directed to an improved bottom end cap 130 for a filter cartridge. The end cap 130 is molded generally as a disk 131 which receives the lower end of the pleat pack 2 and may also receive the lower end of the tubular inner screen 4 as illustrated. The disk 131 is sized in height to securely bond with the lower end of the pleat pack 2 and in diameter to be slightly larger than the diameter of the pleat pack as defined by the outermost edges of the accordion folds thereof. The disk 131 will advantageously incorporate a recess 132 in the central bottom surface thereof for economy of molding material.

As shown in FIGS. 21 & 22, the end cap 130 includes arcuately spaced apart grooves 133 molded into the lower surface of the disk 131. The grooves 133 correspond to projection ridges in the mold cavity forming the end cap 130 on which the end of the pleat pack 2 rests to insure proper positioning of the pleat pack 2 with respect to the end cap 130.

The end cap 130 also includes radial grooves 135 molded into the lower surface of the disk 131. The radial grooves 135 correspond to radial ridges in the mold cavity forming the end cap 130 on which the end of the tubular screen 4 rests to insure proper positioning of the tubular screen 4 with respect to the end cap 130.

As shown in FIG. 22, the end cap 130 also includes a circumferential groove 134 molded into the vertical side wall of the disk 131. The groove 134 corresponds to a positioning ring in the mold cavity having an inside diameter corresponding to the outer diameter of the pleat pack as defined by the outermost edges of the accordion folds thereof to engage the edges of the pleat pack during molding to insure proper concentric alignment of the pleat pack with respect to the bottom end cap 130. Thus, the side groove 134, the bottom grooves 133 and the radial grooves 135 position the end cap 130 both vertically and concentrically with the pleat pack 2 and tubular screen 4 to eliminate manufacturing defects heretofore experienced as a result of bonding a pliable material such as the filter fabric of the pleat pack with a resiliently deformable material used in the molding of the end cap for a filter cartridge.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described our invention, we claim:

1. A unitary filter cartridge to be removably and sealingly received within a circular opening through a tube sheet separating the clean and dirty plenums of filtration apparatus, said tube sheet having an upper surface, a cylindrical mouth surface and a lower surface, said filter cartridge comprising:

a filter sleeve formed as a tubular member having an open upper end oriented toward said tube sheet and an open lower end oriented away from said tube sheet;

a tubular screen positioned interiorly of said filter sleeve for structural support thereof, said tubular screen having an open upper end oriented toward said tube sheet and an open lower end oriented away from said tube sheet;

a bottom end cap sealingly secured to the lower end of said filter sleeve to close said lower end of said filter sleeve; and a unitary tubular, upper fitting including an upper flange extending above said tube sheet, a tube sheet mouth insert, a contoured transition and a lower cylindrical collar extending beneath said tube sheet all integrally formed of flexible, resiliently deformable material, said lower cylindrical collar of said fitting permanently securing said upper end of said filter sleeve, and said upper flange of said fitting overlying said tube sheet adjacent said circular opening to suspendingly support the filter cartridge from said tube sheet;

whereby, when said filter cartridge is installed in said tube sheet, said fitting deformably contacts said tube sheet on at least portions of the three tube sheet surfaces to affect sealing engagement therewith such that at least a portion of said flange of said fitting seals with at least a portion of said upper surface of said tube sheet adjacent said circular opening, said tube sheet mouth insert of said fitting seals with said cylindrical mouth surface of said tube sheet, and at least a portion of said contoured transition of said fitting seals with at least a portion of said lower surface of said tube sheet adjacent said circular opening.

2. The unitary filter cartridge as in claim 1, wherein said fitting is configured to satisfy a relation $0.3<H/D<0.85$; wherein D represents the diameter of said circular opening through said tube sheet and H represents a distance between the upper end of said filter sleeve and said circular opening through said tube sheet.

3. The unitary filter cartridge as in claim 1 wherein, upon installation of said filter cartridge in said tube sheet, said contoured transition of said fitting includes a diameter slightly greater than the diameter of said circular opening to affect sealing engagement with at least a portion of said lower surface of said tube sheet and contours therefrom to a diameter less than or equal to the diameter of said circular opening integrally joining said lower cylindrical collar of said fitting.

4. The unitary filter cartridge as in claim 3 wherein, prior to installation of said filter cartridge in said tube sheet, said contoured transition of said fitting being formed exteriorly in a frusto-conical vertical cross-section including a diameter greater than the diameter of said circular opening and being formed interiorly in a substantially uniform cylindrical vertical cross-section;

whereby, during installation, said transition is resiliently deformed inwardly to pass through said circular opening of said tube sheet and then deflects outwardly to affect sealing engagement with at least a portion of said lower surface of said tube sheet.

5. The unitary filter cartridge as in claim 3 wherein, prior to installation of said filter cartridge in said tube sheet, said contoured transition of said fitting being formed interiorly in a frusto-conical vertical cross-section and exteriorly in a substantially uniform cylindrical vertical cross-section with a diameter less than or equal to the diameter of said circular opening;

whereby, during installation, said transition is passed through said circular opening of said tube sheet and then resiliently deformed outwardly to affect sealing engagement with at least a portion of said lower surface of said tube sheet.

6. The unitary filter cartridge as in claim 5, further comprising a tubular expander with an insertable band including an outer diameter substantially equal to or less than the inner diameter of said upper flange of said upper fitting, said band configured to engage interiorly said frusto-conical portion of said contoured transition of said fitting proximate said circular opening through said tube sheet to outwardly bias portions of the resiliently deformable fitting to affect sealing engagement with said cylindrical mouth surface of said tube sheet and with at least a portion of said lower surface of said tube sheet adjacent said circular opening.

7. The unitary filter cartridge as in claim 6, said frusto-conical portion of said contoured transition of said fitting having an innermost diameter smaller than the largest diameter of said insertable band of said tubular expander whereby said band causes portions of said contoured transition to bulge outwardly beneath said tube sheet to affect sealing engagement with at least a portion of said lower surface of said tube sheet adjacent said circular opening.

8. The unitary filter cartridge as in claim 7, said insertable band comprises a cylindrical vertical wall having a diameter larger than the innermost diameter of said frusto-conical portion of said contoured transition of said fitting to cause portions of said contoured transition to bulge outwardly beneath said tube sheet to affect sealing engagement with at least a portion of said lower surface of said tube sheet adjacent said circular opening.

9. The unitary filter cartridge as in claim 7, said insertable band comprises a funnel wall tapering from a larger upper diameter, which is substantially equal to or less than the inner diameter of said upper flange of said upper fitting, to a smaller lower diameter, which is larger than the inner diameter of said filter sleeve; said funnel wall having an intermediate diameter larger than the innermost diameter of said frusto-conical portion of said contoured transition of said fitting to cause portions of said contoured transition to bulge outwardly beneath said tube sheet to affect sealing engagement with at least a portion of said lower surface of said tube sheet adjacent said circular opening.

10. The unitary filter cartridge as in claim 7, said insertable band comprises: (a) a cylindrical vertical wall having a diameter larger than the innermost diameter of said frusto-conical portion of said contoured transition of said fitting to cause portions of said contoured transition to bulge outwardly beneath said tube sheet to affect sealing engagement with at least a portion of said lower surface of said tube sheet adjacent said circular opening; and (b) a circumferential groove in said cylindrical vertical wall to receive therein a portion of said frusto-conical portion of said contoured transition of said fitting.

11. The unitary filter cartridge as in claim 6, said tubular expander further including a flange ring integrally joined to the upper end of said insertable band to overlie said upper flange of said upper fitting when said filter cartridge is installed in said tube sheet to affect sealing engagement between at least a portion of said flange of said fitting with at least a portion of said upper surface of said tube sheet adjacent said circular opening.

12. A unitary filter cartridge to be removably and sealingly received within a circular opening through a tube sheet separating the clean and dirty plenums of filtration apparatus, said tube sheet having an upper surface, a cylindrical mouth surface and a lower surface, said filter cartridge comprising:

a filter sleeve formed as a tubular member having an open upper end oriented toward said tube sheet and an open lower end oriented away from said tube sheet;

a tubular screen positioned interiorly of said filter sleeve for structural support thereof, said tubular screen having an open upper end oriented toward said tube sheet and an open lower end oriented away from said tube sheet;

a bottom end cap sealingly secured to the lower end of said filter sleeve to close said lower end of said filter sleeve; and a unitary tubular, upper fitting including an upper flange extending above said tube sheet and overlying said tube sheet adjacent said circular opening to suspendingly support the filter cartridge from said tube sheet, a tube sheet mouth insert, a contoured transition and a lower cylindrical collar extending beneath said tube sheet all integrally formed of flexible, resiliently deformable material, said lower cylindrical collar of said fitting permanently securing said upper end of said filter sleeve;

said upper flange of said fitting having an outermost circumferential edge with voids therein, and said contoured transition of said fitting being formed interiorly in a frusto-conical vertical cross-section and exteriorly in a substantially uniform cylindrical vertical cross-section with a diameter less than or equal to the diameter of said circular opening to permit said transition to pass through said circular opening of said tube sheet during installation; and a tubular expander with an insertable band including an outer diameter substantially equal to or less than the inner diameter of said upper flange of said upper fitting, said band configured to engage interiorly said frusto-conical portion of said contoured transition of said fitting proximate said circular opening through said tube sheet to outwardly bias portions of the resiliently deformable fitting to affect sealing engagement with said cylindrical mouth surface of said tube sheet and with at least a portion of said lower surface of said tube sheet adjacent said circular opening;

said tubular expander further including a flange ring integrally joined to the upper end of said insertable band to overlie said upper flange of said upper fitting and to overlie said voids in the outermost circumferential edge of said upper flange when said filter cartridge is installed in said tube sheet to affect sealing engagement between at least a portion of said flange of said fitting with at least a portion of said upper surface of said tube sheet adjacent said circular opening, and adjacent said voids in the outermost circumferential edge of said upper flange to provide a tool access between the flange ring of said expander and the upper surface of the tube sheet to facilitate removal of said expander from engagement with said upper fitting for removing said filter cartridge from said tube sheet;

whereby, when said filter cartridge is installed in said tube sheet, said fitting deformably contacts said tube sheet on at least portions of the three tube sheet surfaces to affect sealing engagement therewith such that at least a portion of said flange of said fitting seals with at least a portion of said upper surface of said tube sheet adjacent said circular opening, said tube sheet mouth insert of said fitting seals with said cylindrical mouth surface of said tube sheet, and at least a portion of said contoured transition of said fitting seals with at least a portion of said lower surface of said tube sheet adjacent said circular opening.

13. The unitary filter cartridge as in claim 12, said upper flange of said fitting having a circumferential scallop edge with uniformly spaced voids to provide a tool access between the flange ring of said expander and the upper surface of the tube sheet to facilitate removal of said expander from engagement with said upper fitting for removing said filter cartridge from said tube sheet.

14. A unitary filter cartridge to be removably and sealingly received within a circular opening through a tube sheet separating the clean and dirty plenums of filtration apparatus, said tube sheet having an upper surface, a cylindrical mouth surface and a lower surface, said filter cartridge comprising:

a filter sleeve formed as a tubular member having an open upper end oriented toward said tube sheet and an open lower end oriented away from said tube sheet;

a tubular screen positioned interiorly of said filter sleeve for structural support thereof, said tubular screen having an open upper end oriented toward said tube sheet and an open lower end oriented away from said tube sheet;

a bottom end cap sealingly secured to the lower end of said filter sleeve to close said lower end of said filter sleeve, said bottom end cap comprising a substantially cylindrical disk having an outside diameter greater than the diameter of said filter sleeve and being formed of flexible, resiliently deformable material, and a circumferential groove in said cylindrical disk which extends inwardly from the outside diameter of said disk to diameter at the bottom of said groove which corresponds to the outside diameter of said filter sleeve to concentrically align said filter sleeve with respect to said bottom end cap; and a unitary tubular, upper fitting including an upper flange extending above said tube sheet, a tube sheet mouth insert, a contoured transition and a lower cylindrical collar extending beneath said tube sheet all integrally formed of flexible, resiliently deformable material, said lower cylindrical collar of said fitting permanently securing said upper end of said filter sleeve, and said upper flange of said fitting overlying said tube sheet adjacent said circular opening to suspendingly support the filter cartridge from said tube sheet;

whereby, when said filter cartridge is installed in said tube sheet, said fitting deformably contacts said tube sheet on at least portions of the three tube sheet surfaces to affect sealing engagement therewith such that at least a portion of said flange of said fitting seals with at least a portion of said upper surface of said tube sheet adjacent said circular opening, said tube sheet mouth insert of said fitting seals with said cylindrical mouth surface of said tube sheet, and at least a portion of said contoured transition of said fitting seals with at least a portion of said lower surface of said tube sheet adjacent said circular opening.

15. The unitary filter cartridge as in claim 14, said bottom end cap further comprises a lower surface which extends beneath the lowermost end of said filter sleeve, and vertical grooves which extend upwardly from said lower surface to the lowermost end of said filter sleeve to vertically position said filter sleeve with respect to said bottom end cap.

16. The unitary filter cartridge as in claim 15, said bottom end cap further comprising radial grooves which extend upwardly from said lower surface to the lowermost end of said tubular screen to vertically position said tubular screen with respect to said bottom end cap.

17. A unitary filter cartridge to be removably and sealingly received within a circular opening through a tube sheet separating the clean and dirty plenums of filtration apparatus, said tube sheet having an upper surface, a cylindrical mouth surface and a lower surface, said filter cartridge comprising:

a filter sleeve formed as a tubular member having an open upper end oriented toward said tube sheet and an open lower end oriented away from said tube sheet;

a tubular screen positioned interiorly of said filter sleeve for structural support thereof, said tubular screen having an open upper end oriented toward said tube sheet and an open lower end oriented away from said tube sheet;

a bottom end cap sealingly secured to the lower end of said filter sleeve to close said lower end of said filter sleeve, said bottom end cap comprising a substantially cylindrical disk having an outside diameter greater than the diameter of said filter sleeve and being formed of flexible, resiliently deformable material, and having a lower surface which extends beneath the lowermost end of said filter sleeve, and vertical grooves which extend upwardly from said lower surface to the lowermost end of said filter sleeve to vertically position said filter sleeve with respect to said bottom end cap; and a unitary tubular, upper fitting including an upper flange extending above said tube sheet, a tube sheet mouth insert, a contoured transition and a lower cylindrical collar extending beneath said tube sheet all integrally formed of flexible, resiliently deformable material, said lower cylindrical collar of said fitting permanently securing said upper end of said filter sleeve, and said upper flange of said fitting overlying said tube sheet adjacent said circular opening to suspendingly support the filter cartridge from said tube sheet;

whereby, when said filter cartridge is installed in said tube sheet, said fitting deformably contacts said tube sheet on at least portions of the three tube sheet surfaces to affect sealing engagement therewith such that at least a portion of said flange of said fitting seals with at least a portion of said upper surface of said tube sheet adjacent said circular opening, said tube sheet mouth insert of said fitting seals with said cylindrical mouth surface of said tube sheet, and at least a portion of said contoured transition of said fitting seals with at least a portion of said lower surface of said tube sheet adjacent said circular opening.

\* \* \* \* \*